United States Patent
Havican et al.

(10) Patent No.: US 9,626,389 B1
(45) Date of Patent: Apr. 18, 2017

(54) DATA COMPRESSION MODEL FOR MOBILE DEVICE DISCONNECTED OPERATIONS

(71) Applicant: International Business Machines Corporation, Armonk, NY (US)

(72) Inventors: David J. Havican, Westford, MA (US); Sean L. Stuckless, London (CA); Timothy J. Thompson, St. Thomas (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/010,314

(22) Filed: Jan. 29, 2016

(51) Int. Cl.
G06F 17/30 (2006.01)

(52) U.S. Cl.
CPC .. *G06F 17/30292* (2013.01); *G06F 17/30374* (2013.01)

(58) Field of Classification Search
CPC .............. G06F 17/30292; G06F 17/30374
USPC ......................................... 707/793
See application file for complete search history.

(56) References Cited

U.S. PATENT DOCUMENTS

| | | |
|---|---|---|
| 5,761,429 A | 6/1998 | Thompson |
| 6,023,702 A | 2/2000 | Leisten et al. |
| 6,317,737 B1 | 11/2001 | Gorelik et al. |
| 6,421,717 B1 | 7/2002 | Kloba et al. |
| 8,121,585 B2 | 2/2012 | Commarford et al. |
| 9,113,000 B2 | 8/2015 | Havican et al. |
| 2002/0083132 A1* | 6/2002 | Holland ............. G06F 17/3089 707/E17.116 |
| 2003/0006913 A1 | 1/2003 | Joyce et al. |
| 2005/0050172 A1* | 3/2005 | Redpath ............ G06F 17/30899 707/E17.119 |
| 2006/0089152 A1 | 4/2006 | Mahonen |

(Continued)

FOREIGN PATENT DOCUMENTS

| | | |
|---|---|---|
| WO | 2004042606 A2 | 5/2004 |
| WO | 2006102473 A2 | 9/2006 |
| WO | 2011090598 A3 | 7/2011 |

OTHER PUBLICATIONS

LANSA, "Building Business Applications for Mobile Devices," a LANSA White Paper, Feb. 2012, pp. 1-11, V1.0, © 2012 LANSA.

(Continued)

*Primary Examiner* — Rehana Perveen
*Assistant Examiner* — Tiffany Thuy Bui
(74) *Attorney, Agent, or Firm* — Laura E. Gisler

(57) ABSTRACT

A method for analyzing an enterprise application linked to a mobile device application. The method includes determining that the enterprise application performs a first set of roles. The method also includes analyzing the mobile device application. The method also includes determining that the mobile device application performs a second set of roles. The method also includes receiving an input parameter at the mobile device application, and generating a mobile data structure in response to the determining that the mobile device performs the second set of roles. The method also includes receiving an indication of a planned disconnect of the mobile device application from the enterprise application. The method also includes storing, in response to the receiving the indication of planned disconnect, the generated data structure in the mobile device for disconnected execution.

15 Claims, 14 Drawing Sheets

(56) References Cited

U.S. PATENT DOCUMENTS

| | | |
|---|---|---|
| 2006/0095434 A1 | 5/2006 | McCullough et al. |
| 2006/0212530 A1* | 9/2006 | O'Farrell .......... G06F 17/30557 |
| | | 709/212 |
| 2007/0294312 A1 | 12/2007 | Seshadri et al. |
| 2008/0155525 A1 | 6/2008 | Ho |
| 2009/0228545 A1 | 9/2009 | Mendez et al. |
| 2009/0282125 A1 | 11/2009 | Jeide et al. |
| 2010/0146073 A1* | 6/2010 | Dittmar .................. H04W 4/02 |
| | | 709/218 |
| 2010/0198908 A1* | 8/2010 | Kumar .................. G06F 9/4843 |
| | | 709/203 |
| 2011/0275344 A1* | 11/2011 | Momtahan ............. H04L 12/14 |
| | | 455/405 |
| 2011/0276608 A1 | 11/2011 | O'Farrell et al. |
| 2012/0239704 A1 | 9/2012 | O'Farrell et al. |
| 2014/0004886 A1 | 1/2014 | Gillett et al. |
| 2014/0130019 A1* | 5/2014 | Beskrovny ................ G06F 8/74 |
| | | 717/131 |
| 2014/0164944 A1* | 6/2014 | Sivakumar ........ G06F 17/30905 |
| | | 715/746 |
| 2014/0188616 A1 | 7/2014 | Badenhop |
| 2014/0337528 A1* | 11/2014 | Barton .................... H04L 63/10 |
| | | 709/225 |
| 2015/0056948 A1 | 2/2015 | Havican et al. |
| 2016/0094497 A1* | 3/2016 | Javed ..................... H04L 51/06 |
| | | 709/206 |

OTHER PUBLICATIONS

Mell et al., "The NIST Definition of Cloud Computing: Recommendations of the National Institute of Standards and Technology," Special Publication 800-145, National Institute of Standards and Technology, Sep. 2011, 7 pages, Gaithersburg, MD.

Havican et al., "Generating Mobile Data Schema to Support Disconnected Operations," U.S. Appl. No. 15/010,293, filed Jan. 29, 2016.

List of IBM Patents or Patent Applications Treated as Related, signed Jan. 28, 2016, 2 pages.

* cited by examiner

US 9,626,389 B1

DATA COMPRESSION MODEL FOR MOBILE DEVICE DISCONNECTED OPERATIONS

BACKGROUND

Aspects of the present disclosure relate to mobile computing, and more particular aspects relate to generating data schemas for mobile devices for use when disconnected.

With the proliferation of mobile devices, remote or off-site application interaction is becoming a basic requirement for enterprise applications. Although wireless communication networks are expanding at an incredible rate, there still exists situations where connectivity is unavailable either due to physical location (e.g., deep in a mine or on a ship in the middle of the ocean) or security restrictions (e.g., a secure room or an airplane).

In these cases, loss of connectivity may not be short-term but rather a long-term planned event. While disconnected from a network, many enterprise applications can require a mobile device to perform data modification in order to complete a specific application task. Completion of a maintenance work-order, for example, may require information about the location, item to be worked on, related items or components, tools, maintenance history, etc.

SUMMARY

According to embodiments of the present disclosure, a method, system, and computer program product are disclosed for generating and utilizing a data compression model for mobile device disconnected operations.

One embodiment is directed toward a method for adjusting a mobile function during a planned disconnect from an enterprise server. The method includes analyzing an enterprise application linked to a mobile device application, where the enterprise application is located on the enterprise server. The method also includes determining that the enterprise application performs a first set of roles. The method also includes analyzing the mobile device application on a mobile device, including analyzing a user interface structure on the mobile device. The method also includes determining that the mobile device application performs a second set of roles, where the second set of roles is a subset of the first set of roles. The method also includes receiving an input parameter at the mobile device application. The method also includes generating a mobile data structure in response to the determining that the mobile device performs the second set of roles, where the mobile data structure is stored on the mobile device, and where the mobile data structure is configured to perform the second set of roles. The method also includes receiving an indication of a planned disconnect of the mobile device application from the enterprise application. The method also includes storing, in response to the receiving the indication of planned disconnect, the generated data structure in the mobile device for disconnected execution.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
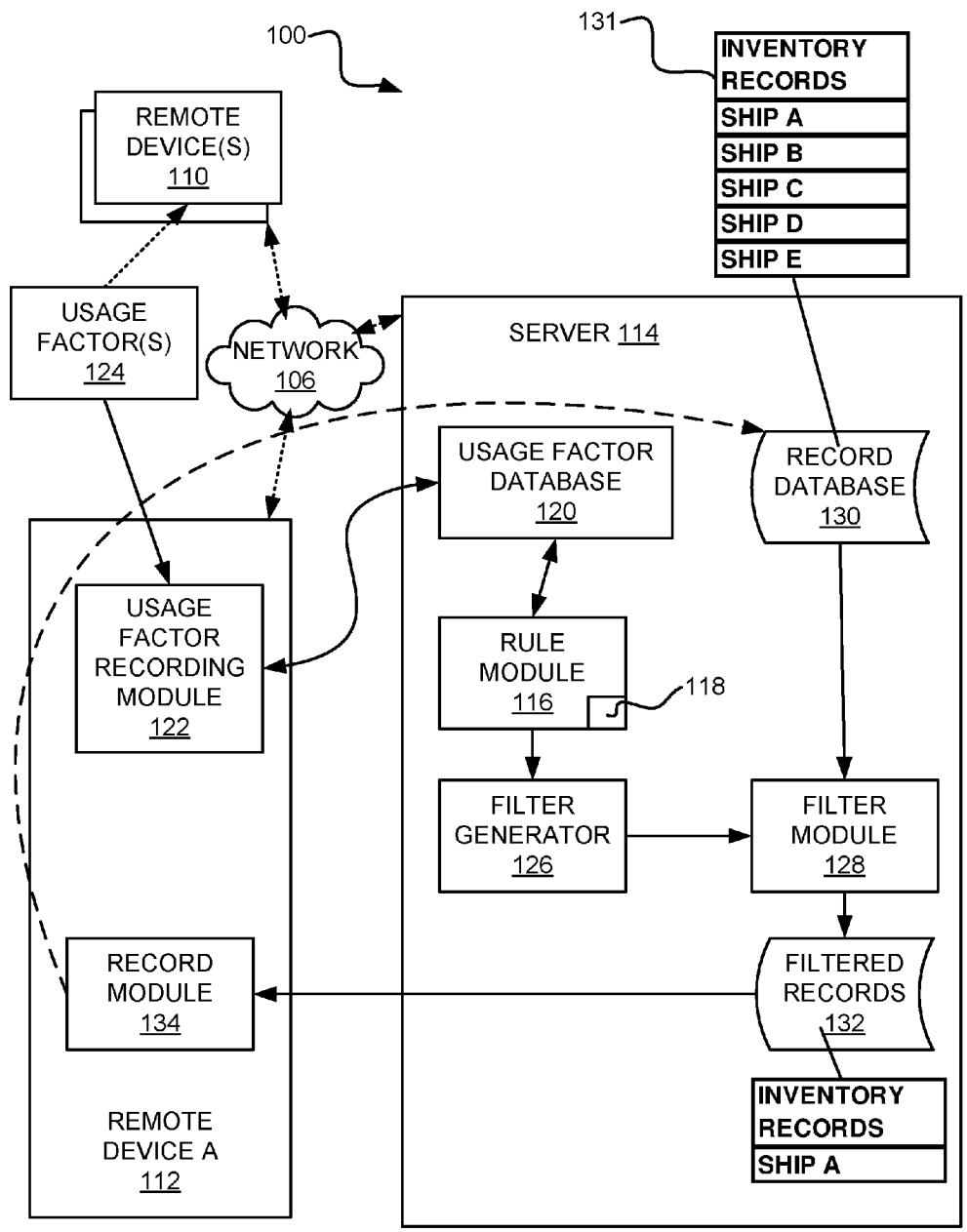
FIG. 1 depicts a block-level diagram of a computing system for filtering a plurality of records, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to mobile computing, and more particular aspects relate to generating data schemas for mobile devices for use when disconnected from wireless communication networks.

The present disclosure describes various methods and systems for flattening an enterprise application data model into a simplified mobile data model to be stored on a mobile device in order to maintain specific or critical mobile functions on the mobile device in a case of a planned or foreseen network disconnect. A mobile user interface may be analyzed in order to determine the specific or critical mobile functions. Data within the simplified mobile data model may be validated to assure coherence prior to the disconnection.

A rule can have a condition and a response to the condition. When a condition, e.g., location, is satisfied by a remote device, then a computer, e.g., a server, can implement the response to the condition. The response to the condition can be an action that the computer takes, e.g., filtering values in the database in response to a location condition.

The store-and-forward model of data replication when applied to mobile devices introduces several challenges regarding storage capacity, efficiency/performance of data transfer, in addition to either duplication of business rules for a mobile device or the risk of errors when disconnected data is fed back to the core application.

Due to space limitations, it is not always practical to replicate an entire dataset, such as an enterprise record database, on the mobile device. Certain solutions, such as data compression, can still result in large amounts of data replication. Filtering records (e.g., to remove records that are unlikely to be used) can improve storage, particularly for remote devices, which may not be able to store an entire database locally. Thus, the filtering of records ensures that the remote device stores what is most likely to be needed. The records on the remote device can be further updated using the remote device without network access and may be synchronized with the server when network access is reestablished. Filtering records can also reduce the amount of bandwidth used by a database by reducing the amount of data transmitted from the server to the remote device.

FIG. 1 depicts a block-level diagram of a computing system 100 for filtering a plurality of records, according to various embodiments. The computing system 100 can be used to facilitate the filtering of data for offline use. For instance, a remote device A (also referred to as remote device 112) can receive filtered records 132 from a record database 130 for use when network access is not possible, e.g. when on a ship where network access is unavailable, inconsistent or otherwise not practical. As an example used to illustrate different features of the various embodiments, a remote device "A" can conduct an inventory on a ship, e.g., SHIP A. The inventory can occur without network access by accessing (reading, adding or modifying) a local copy of data originating from a record database 130. The local copy of data can be synchronized with the record database 130 once network access is restored. The record database 130 can contain inventory records 131 for a plurality of ships. The inventory records 131 can be used by remote device A in order to conduct the inventory.

As discussed herein, the record database 130 can be relatively large, such that it is impractical (or impossible) to store a copy of the entire set of inventory records 131 on the remote device A. Aspects of the present disclosure are directed toward the selection and use of a filter to reduce the amount of data copied to the remote device A to a manageable size. In particular embodiments, the record database 130 can be filtered based on a usage factor 124 derived from one or more rules.

The computing system 100 can have one or more remote devices 110, including a remote device 112, and a server 114. The remote device 112 is shown as an example of a particular remote device, however, any number of the remote devices 110 can be part of the computing system 100. Generally, the remote devices 110, 112 can communicatively couple to the server 114 and both receive and transmit data from the server 114. In some instances, the remote devices 110, 112 may communicatively couple to the server 114 via a network 106, examples of which are described further herein.

The server 114 can include a rule module 116. The rule module 116 can receive rules from an application, e.g., the rules can be generated from user input to the application or automatically generated by the application. A rule can have a condition and a response to the condition. For example, the rule can be structured with a condition such as "IF location=SHIP A", and a response such as "THEN filter records=SHIP A". The rules can vary based on each user (or device) accessing the server 114. For instance, each user can have a respective set of rules where individual rules in the set can be common to other users or be unique to a particular user. The rule module 116 can hold any number of rules. For example, the rule module 116 can hold 1,000 rules and 30 rules can apply to a first user, and 140 rules can apply to a second user. The rule module 116 could hold 40 rules that apply to all users. Various combinations of rule sets are possible.

The rule module 116 can be configured to use a profile. A profile can be a set of rules for a particular user. The user can login to the remote device 110 and the server 114 can determine the specific rules that apply to the user. Each user can have different sets of rules that apply depending on the profile used.

The rule module 116 can include a rule module extractor 118. The rule module extractor 118 can be a part of the rule module 116 or it can be a separate module. The rule module extractor 118 can extract a condition from a particular rule. For example, in the above example, the rule module extractor 118 can extract the condition "IF location=SHIP A" to a usage factor database 120.

In various embodiments, a usage factor 124 can be derived from the condition. In the above example, the usage factor of location can be derived from the statement "IF location." The satisfaction of the usage factor can be a usage factor result, e.g., a location measurement. The location measurement can be "SHIP A". In various embodiments, an actual usage factor 124 from the remote device 112 can be measured to produce the usage factor result that is synchronized with the usage factor database 120. For example, if the usage factor 124 is a location, then the actual usage factor 124 can be measured by a GPS of the remote device 112. If the GPS of the remote device 112 is non-functional then the remote device 112 can indicate a blank in the space of location, use a last known location or use another method of location determination (e.g., based upon the location of an access point or cellular tower used by the remote device 112).

The remote device 112 can measure the actual usage factors 124 for the usage factor database 120 using a usage factor recording module 122. The usage factor recording module 122 can consult with the usage factor database 120 to determine which usage factors 124 to measure. In various embodiments, the usage factor database 120 can transmit targeted usage factors 124 to multiple remote devices 110, 112. For example, if the usage factor database 120 has the usage factors 124 of geographic location, available space, and network strength, then these usage factors 124 can be measured by all remote devices 110 using the usage factor recording module 122 of each remote device 110, 112. The usage factor recording module 122 can determine if the usage factor 124 is capable of being measured by the remote device 110, 112. For example, if there are no GPS capabilities on a remote device 110 or 112, then the geographic location cannot be measured and the usage factor recording module 122 can transmit a value such as "Location (Remote device A)=Invalid" to indicate to the usage factor database 120 that the geographic location cannot be measured.

In various embodiments, the targeted usage factors 124 may be preselected by the usage factor recording module 122. For example, if the usage factor database 120 has a geographic location usage factor, an available space usage factor, and a network strength usage factor, but the usage factor recording module 122 detects an absence of a GPS module on the remote device, i.e., that the remote device is incapable of measuring the geographic location usage factor, then the usage factor recording module 122 can avoid measuring the geographic location usage factor and sharing the geographic location usage factor with the usage factor database 120.

The usage factor recording module 122 can collect information on one or more usage factors 124. Examples of usage factors 124 can be described more fully therein. The usage factors 124 measured by the usage factor recording module 122 can be transmitted to the usage factor database 120. For example, if the usage factor 124 is location, then the usage factor recording module 122 can transmit a location for the remote device to the usage factor database 120. Any previous location readings for the remote device can be ignored or discarded by the usage factor database 120.

In various embodiments, the rule module 116 can receive a usage factor with a usage factor result from the usage factor database 120. The usage factor result can correspond to a usage factor 124, such as location of a particular remote device, along with the associated value for the usage factor 124, e.g., SHIP A. The rule module 116 can take the usage factor result and use a filter generator 126.

The filter generator 126 can be a part of the rule module 116 or a separate module. The filter generator 126 can implement the response described herein. In various embodiments, the filter generator 126 can compare the usage factor 124 in the usage factor database 120 to the condition in the rule. For example, one condition could be "IF location (remote device A)=SHIP A." In this example, the filter generator 126 can search the usage factor database 120 for the location usage factor result for remote device A 112. If the location for remote device A 112 is SHIP A, then the condition is met and the response to the condition can be implemented on the server 114. However, if the location for remote device A 112 is SHIP B, then the condition is not met and the response if not implemented.

A filter module 128 can implement the response to the condition. In various embodiments, the filter module 128 can filter the results, i.e., the inventory records 131, from the record database 130 to obtain a filtered record 132. The filter module 128 can use the rule from the rule module 116 to filter the record database 130. For example, if the rule is "IF location(remote device A)=SHIP A, THEN copy records=SHIP A", then the filter module 128 can receive an indication that the condition is met from the filter generator 126 and copy the inventory records 131 by filtering out records that are not SHIP A from the record database 130 and thereby creating the filtered records 132. The filtered records 132 may be stored, at least temporarily, in a storage circuit or device, such as a buffer or a hard disk drive.

The filtered records 132 can be transmitted to the record module 134 of remote device A. Once the remote device A has the filtered records 132, the remote device A can use the local copy in the record module 134 irrespective of the presence of network access (e.g., whether a planned or an unexpected/sudden loss of network access). For example, if the records for SHIP A are inventory records for all equipment inside of the ship, then the remote device A can conduct an inventory without network access because the filtered records 132 are transmitted to the record module 134. Assuming that the inventory involves a user to indicate that the equipment is present, the presence of the equipment can be saved locally. Once network access is restored, e.g., when the ship returns to port, then the inventory records can be synchronized with the record database 130.

Figure 2:
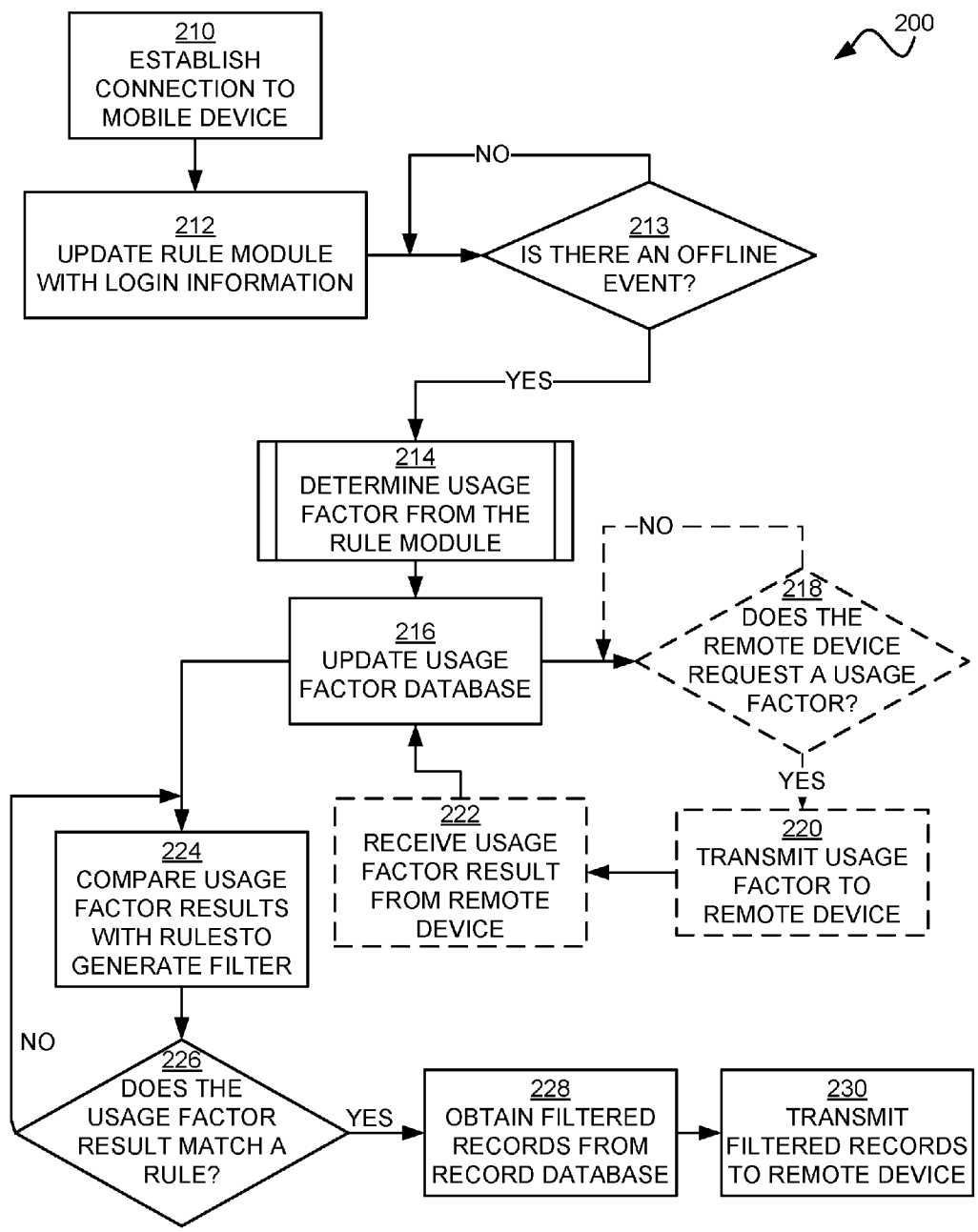
FIG. 2 depicts a flowchart of a method of filtering records to produce a filtered record that is transmitted to a remote device, according to various embodiments.

FIG. 2 depicts a flowchart of a method 200 of filtering records to produce a filtered record that is transmitted to a remote device, according to various embodiments. The method 200 can begin at operation 210. In operation 210, a server, e.g., the server 114 in FIG. 1, can establish a connection to a mobile device, e.g., a mobile device 110, 112 in FIG. 1. The connection can occur through a network or can be a physical connection to the server, e.g., a Universal Serial Bus connection. The connection can be capable of enabling the remote device and the server to communicate. In various embodiments, the remote device can initiate the connection with the server. After a connection is established between the server and the remote device, then the method 200 can continue to operation 212.

In operation 212, a rule module, e.g., rule module 116 from FIG. 1, can be updated using login information of a particular user. For example, a rule module can be loaded with a profile for a first user and a profile for a second user. A profile can contain a set of one or more rules associated with a particular user. For example, when accessed by a remote device, the profile can contain a rule for a particular user. In various embodiments, the rule can also include conditions that, when satisfied, result in a corresponding action or response. For instance, a condition could be if a location is within three meters of a wireless access point, then the remote device synchronizes its local database with the server. The condition(s) can be simple or relatively complex (e.g., multiple conditions can be grouped). For instance, the above condition can be further limited to only if a particular user logs into the server. Accordingly, the rules that apply to the first user do not necessarily apply to the second user. The first user can login using credentials which can load the first user's profile. After the rule module is updated with the login information, then the method 200 can continue to operation 213.

In operation 213, the rule module can determine if there is an offline event. In certain embodiments the offline event can indicate that the remote device may go offline sometime in the future. This indication can be based upon user input, an automated prediction (e.g., based upon usage history) and combinations thereof. For instance, the prediction can be based off of a history of the remote device using factors such as signal strength, a velocity vector, or location. For example, assuming the prediction is based off of the history of the remote device, if the remote device always loses signal once it boards a particular ship at a particular port, and the remote device has historically been at a particular ship every Wednesday at 0500 in the morning, then the rule module can determine that there is an offline event on Wednesday at 0500.

Another example of an offline event can be a signal strength that declines as a function of time. This might be relevant, for example, if the remote device's location is moving away from an access point at a constant speed, then the signal strength would be declining. The remote device can predict when the access point connection will be lost based on the declining signal strength as a function of time.

The time between the offline event and the loss of network access can be defined by the user or based on the amount of time it takes to upload data onto the remote device. Using the aforementioned example, if the time to load data into the remote device takes 1.5 hours, then the offline event would exist if the remote device's current time is 0329. According to various embodiments, if the remote device's current time is 0400, then the application may determine that the offline event does not exist because (e.g. where the partial transmission of the desired data is not effective in preparing for the loss of network access). In certain embodiments, the particular data being transferred can be prioritized to allow for more relevant data to be transferred first to mitigate incomplete data transfers (e.g., due to insufficient time before network loss).

The offline event can be determined by a signal map for network (e.g., cellular) coverage. Assuming a projected path, such as when driving or flying, the offline event can be based on the velocity vector of the remote device and a map of network coverage. Assuming that a predicted position based on the velocity vector would result in the remote device having poor network coverage, then a trigger event can be detected so that the remote device can be loaded with data while network access exists. If there is no offline event, then the method 200 can continue to monitor for an offline event in operation 213. If there is an offline event, then the method 200 can continue to operation 214.

In operation 214, a rule module can determine or identify a usage factor. The determined usage factor can then be measured by the remote device. In various embodiments, the usage factor can be determined by the remote device based on device capabilities. For example, if the remote device does not have a GPS sensor, then location is less likely to be measurable by the remote device (or it may be less accurate). The determination of the usage factor list can be described herein. After the usage factor list is determined, then the method 200 can continue to operation 216.

In operation 216, the usage factor database can be updated with the usage factors from the rule module. The usage factor database can hold usage factors as well as usage factor results. The usage factor result can be a result of a measurement of a usage factor for a remote device. For example, if the usage factor database contains usage factors for location, network latency, or location relative to another device for a particular remote device, then the usage factor database can be just the term "location (remote device). The usage factor result can be "location (remote device)=docks".

After the usage factor database is updated in operation 216, the method 200 can update the usage factor database using the usage factor results collected by a remote device in operations 218, 220, and 222. Operations 218, 220, and 222 can be optional in response to the remote device requesting usage factors from the usage factor database. If the remote device requests usage factors, then the remote device can measure the usage factors described herein. In various embodiments, the remote device can also be configured to not request usage factors from the usage factor database and automatically make measurements based on capabilities of the remote device.

Operation 218 and 220 may be combined, according to various embodiments. In operation 218, the remote device can request a usage factor. In various embodiments, operation 218 depends on the remote device. The remote device can receive all of the usage factors from the server in various embodiments. Thus, the remote device can be blank as an initial state and unfamiliar as to which usage factors to record until instructed by the server. If there is no request, then the method 200 can cycle back until there is a request by a remote device. If there is a request, then the method 200 can continue to operation 220.

In operation 220, the usage factors can be transmitted to the remote device from the usage factor database. For example, the remote device can be instructed to measure all of the usage factors from the usage factor database, or merely a subset of the available usage factors. When the remote device is not capable of measuring the usage factor, the remote device can reply with a blank value (or other indication) for the usage factor result.

As an alternative to operation 218 and operation 220, the remote device may first determine the resources available to it and measure only the usage factors that it has the capability to measure. For example, the remote device can first determine that it has only a GPS capability, as well as a near field communication sensor to detect other remote devices and measure only the geographic location and the proximity usage factors. The usage factors can also be selected based upon parameters including, but not limited to, the identity of either the user or remote device, the type of connection to the remote device, the type of data stored in the database and combinations thereof.

Once the usage factors are measured to produce a usage factor result, then the method 200 can continue to operation 222. In operation 222, the server can receive the usage factor results from the remote devices. The usage factor results can be compiled into the usage factor database in operation 216. After the usage factor results are obtained in operation 216, then the method 200 can continue to operation 224.

In operation 224, a rule module on the server can compare the usage factor results obtained from the usage factor database, to a condition for a rule. For example, a usage factor result of "location(remote device)=SHIP A" can correspond to any measurement for the location of the particular remote device, e.g., "IF location (remote device)=SHIP A," and result in a match. The match can be determined in operation 226. If there is not a match, then the method 200 can continue to operation 224 where the results are compared until there is a match. If there is a match, then the method 200 can continue to operation 228.

In operation 228, records from the record database are filtered using the rule. Using an aforementioned example, if the rule is "IF location(remote device)=SHIP A, THEN copy SHIP A records," then the response, i.e., "THEN copy SHIP A records", would be implemented by a filter module. The filtered records can be transmitted to the remote device in operation 230. In various embodiments, the filtered records can be prioritized based on the rules. For example, if the rule is related to the predicted duration of network access and if there are 10 records to transmit but the remote device can only accommodate 9 records, then the record associated with the highest predicted duration of network access can have the lowest priority since the record can have more leeway in waiting to upload. After the filtered records from the record database are obtained, then the method 200 can transmit the filtered records to the remote device in operation 230.

Figure 3:
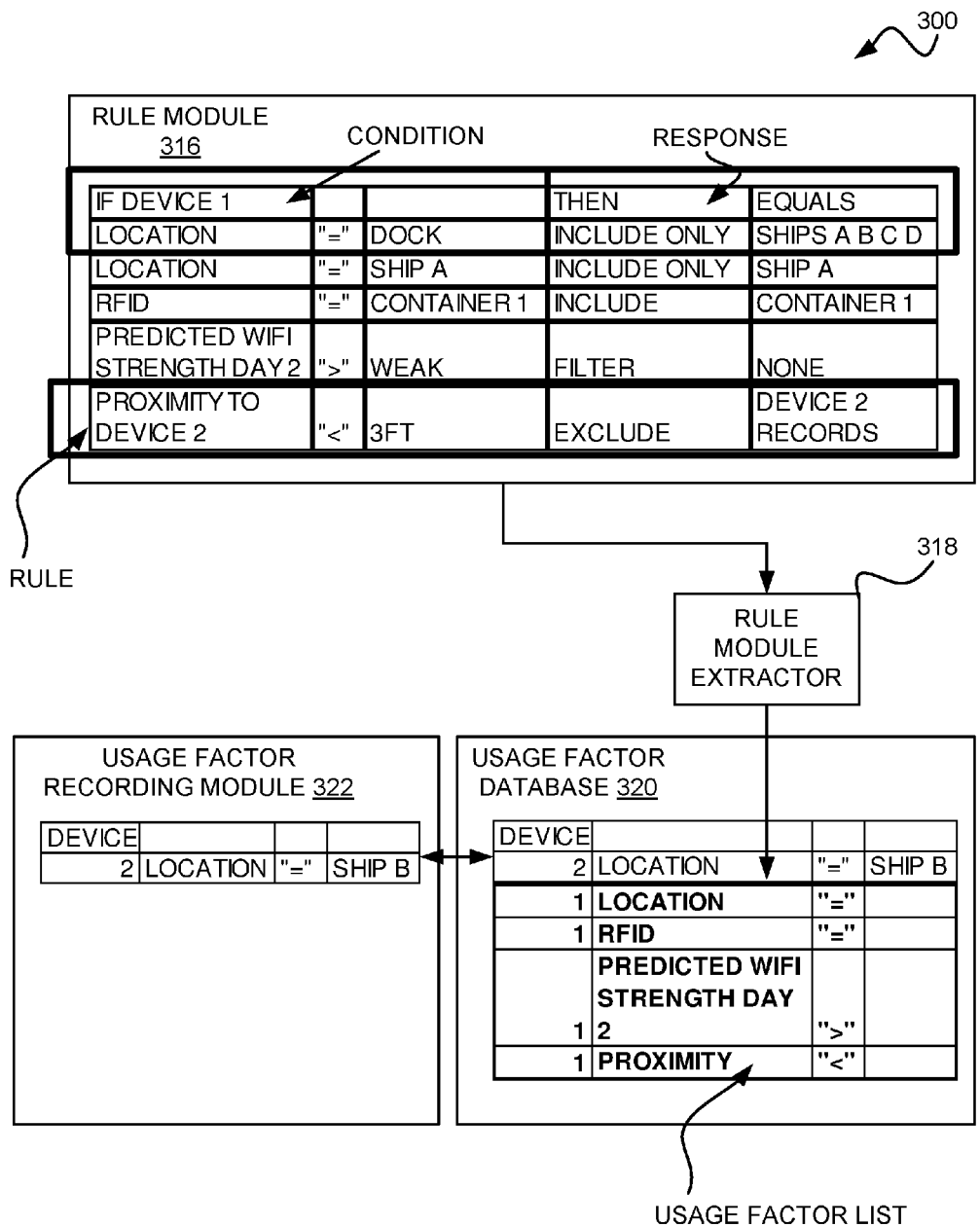
FIG. 3 depicts a method of determining a usage factor from a rule using components from a server, according to various embodiments.

FIG. 3 depicts a block diagram 300 of how a usage factor is determined from a rule using components from a server, according to various embodiments. The block diagram 300 can correspond to operation 214 from FIG. 2. Components of FIG. 3 can correspond to components of FIG. 1, but are not necessarily limited thereto. For example, the rule module 316, the rule module extractor 318, the usage factor database 320, and the usage factor recording module 322 can correspond to the rule module 116, the rule module extractor 118, the usage factor database 120, and the usage factor recording module 122 from FIG. 1.

The rule module 316 can contain one or more rules. A sample rule is highlighted where "IF proximity to a remote device 2(remote device 1)<3 ft, THEN exclude remote device 2 records". The rule module extractor 318 can take the rule and reduce the rule to a condition, i.e., IF proximity to a remote device 2(remote device 1)<3 ft. The condition can further include the usage factor (not shown), e.g., "device1(location)." The usage factors for the rules can be compiled into the usage factor database 320. In various embodiments, the usage factors can be grouped into a usage factor list, which can be optional. The usage factor list can be a collection of usage factors that are grouped according to a parameter, e.g., the remote device the rule applies to, or the remote device that has the capability to measure the usage factor.

In various embodiments, the usage factor list can be received by the remote device to measure the usage factor using a usage factor recording module 322. As discussed herein, the usage factor recording module 322 can use other measurement methods for measuring a usage factor. In the block diagram 300, the usage factor recording module 322 for a device 2 can measure the location as "SHIP B" and transmit the location for device 2 to the usage factor database 320.

Figure 4:
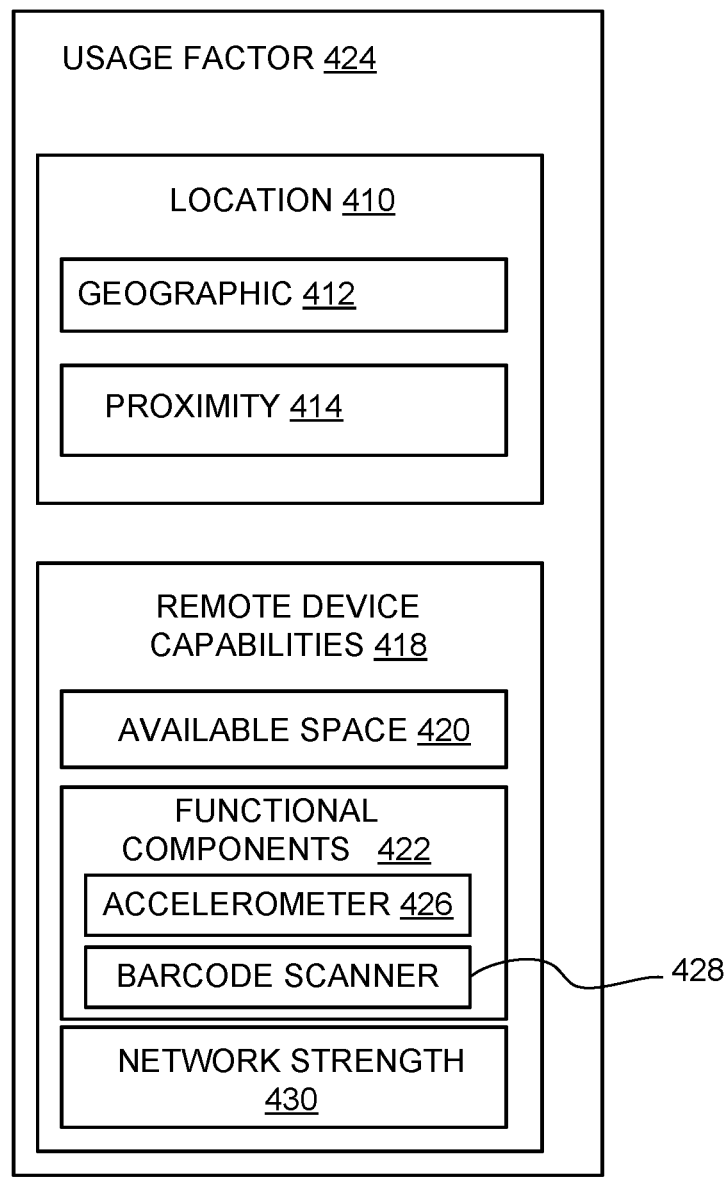
FIG. 4 depicts a sample of usage factors, according to various embodiments.

FIG. 4 depicts a sample of usage factors 424, according to various embodiments. Consistent with certain embodiments, the usage factor 424 can correspond to the usage factor from various figures and embodiments, such as usage factor 124 from FIG. 1. The usage factors 424 described herein are provided as an example and are not intended to be limiting. The usage factors 424 can be based on location or device, i.e., remote device capabilities 418.

If the usage factors 424 are based on location 410, then the location can be a geographic location 412. The geographic location 412 can refer to a physical position based on a map. For example, a geographic location 412 can refer to a user located at a ship in a particular shipping port. The location 410 can also be a proximate location 414 or relative to an object. For example, the proximate location 414 can be where a remote device is located within 3 feet of another remote device or a network access point.

The usage factors 424 can also include the capabilities of the remote device 418. Capabilities can generally refer to the usage factors that can be measured by the remote device. The usage factors can include the available storage or memory space 420 on the remote device. For example, the available space 420 usage factor can be used to filter records when the available space is below a certain value (or to increase the amount of filtering). The usage factors 424 can include the network strength 430, or connection type (e.g., 3G, 4G, WiFi), of the remote device. For example, the network strength 430 can be used to select the records that have large file sizes in response to a strong network strength.

The usage factors 424 can include readings from functional components 422, including an accelerometer 426 or a barcode scanner 428. Readings from the accelerometer 426 can be used to select only inventory records of items below the deck of a ship when the accelerometer 426 detects the remote device descending in an elevator. The barcode scanner 428 usage factor can be used in a rule that retrieves only records that were scanned by the barcode scanner in the past by the remote device.

Figure 5:
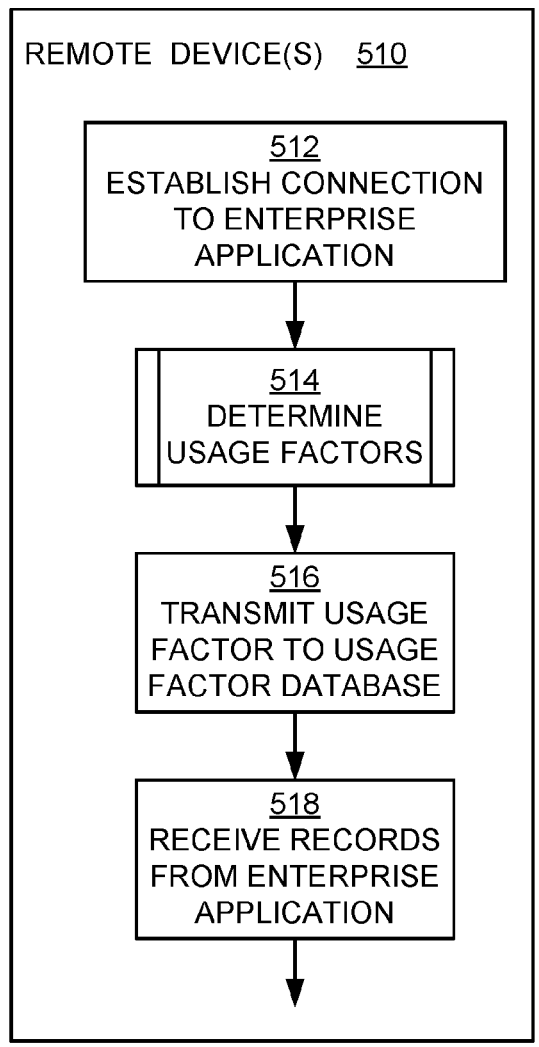
FIG. 5 depicts a method of retrieving records from a server for a remote device, according to various embodiments.

FIG. 5 depicts a method 500 of retrieving records from a server for a remote device, according to various embodiments. The method 500 can occur within the context of the remote device 510. In embodiments, the remote device 510 can correspond to the remote device 110 from FIG. 1. The method 500 can begin at operation 512.

In operation 512, the remote device can establish a connection with an enterprise application. The enterprise application can be an application that manages the placement of records and implements the method of filtering records. In various embodiments, the enterprise application can be hosted by the server. Once a connection is established, then the method 500 can continue to operation 514.

In operation 514, the remote device 510 can determine which usage factors to use. In various embodiments, the remote device 510 can push the usage factors that it is capable of measuring to the server. The remote device 510 can request usage factors to measure from the server. Operation 514 can also include the measurement of a usage factor by the remote device 510. After the usage factors are determined in operation 514, the method 500 can continue to operation 516.

In operation 516, the remote device 510 can transmit the measured usage factors to a usage factor database housed on the server. The remote device can retain copies of the measurement locally. In various embodiments, the remote device can update the usage factors offline and transmit the usage factors to the server when the network connection is restored. After the usage factor is transmitted in operation 516, the method 500 can continue to operation 518.

In operation 518, the remote device 510 can receive filtered records from the enterprise application on the server. The filtered records can be filtered from a larger record database. The filtered records can be applicable to the remote device. For example, if the remote device is going to SHIP A to conduct an inventory, then the filtered records can be an inventory of all the items on ship A. After operation 518, then the method 500 can end.

Figure 6:
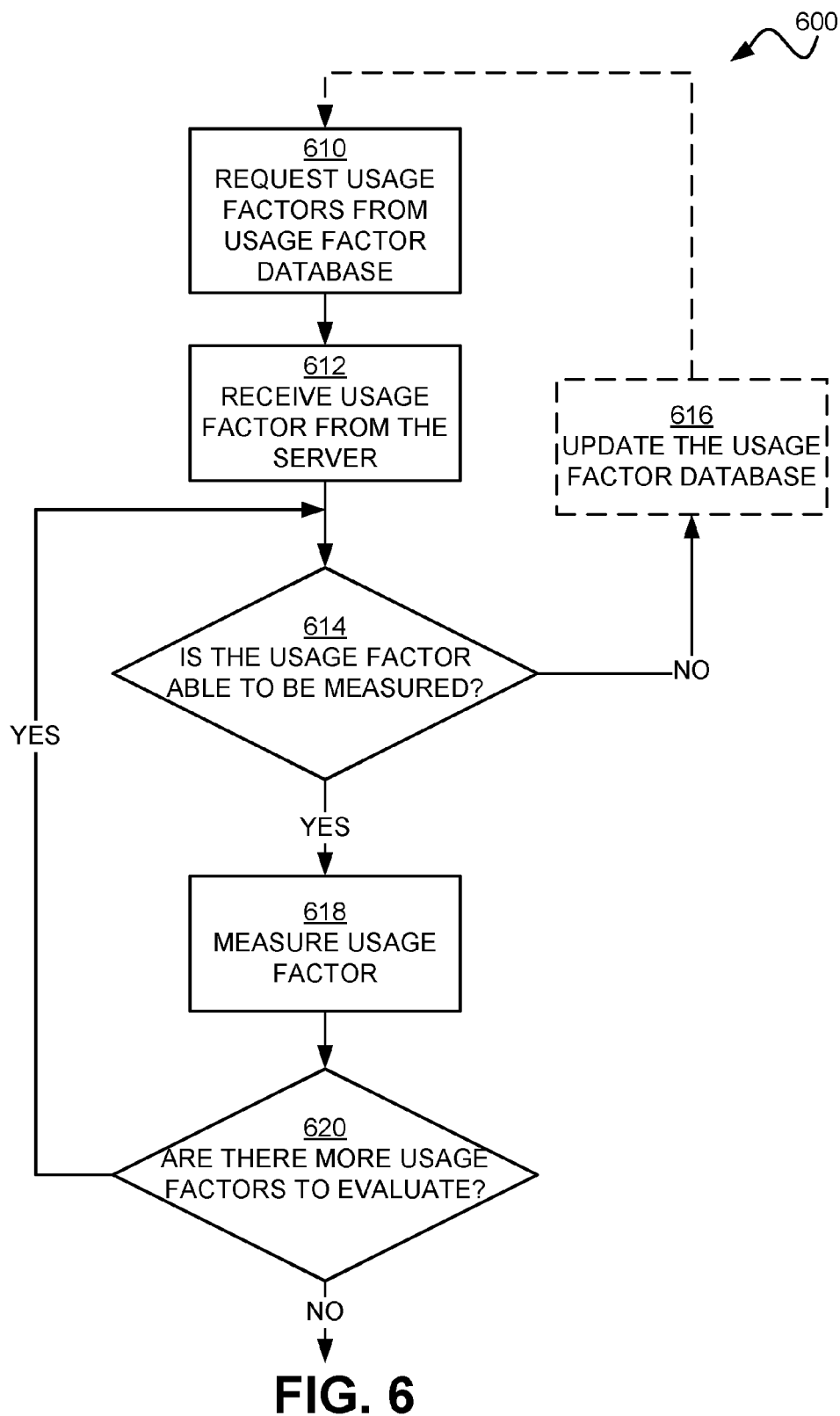
FIG. 6 depicts a method of determining a usage factor for a remote device, according to various embodiments.

FIG. 6 depicts a method 600 of determining a usage factor for a remote device, according to various embodiments. In some embodiments, the method 600 can correspond to operation 514 from FIG. 5. The method 600 can begin at operation 610. In operation 610, a remote device can request usage factors from the server, specifically the usage factor database. In various embodiments, the request can be accompanied by a list of usage factors that the remote device is able to measure. Once the usage factors are requested from the server, then the method 600 can continue to operation 612.

In operation 612, the remote device can receive the usage factors to measure from the server. In various embodiments, the remote device can receive a usage factor list from the server that includes a listing of all of the applicable usage factors for the remote device to measure.

In operation 614, the remote device can determine if the usage factor is capable of being measured. The remote device can define capable of being measured by capabilities of hardware and software components present on the remote device, as well as by the presence or absence or external inputs (e.g., a GPS signal or wireless access point). In various embodiments, the remote device can be capable of measuring a location without a GPS sensor by using a feature such as network triangulation. Likewise, the remote device can be capable of measuring an inventory number with a keypad instead of a barcode scanner. In various embodiments, the enterprise application can define the capabilities of a remote device. For example, if the enterprise application will only accept a GPS measurement for location. If the remote device cannot be measured with the remote device, then method 600 can continue to operation 616.

In operation 616, the remote device can send an indication to the usage factor database on the server that the usage factor cannot be measured. In various embodiments, operation 616 can be optional, so that the remote device does not have to send an indication that the usage factor cannot be measured. The server can update the usage factor database to associate a limitation of measurement to the remote device to develop a history. After the usage factor database is updated, then the method 600 can continue to operation 610 where the usage factors can be requested by the mobile device.

If the usage factor can be measured by the remote device, then the method 600 can continue to operation 618 where the usage factor is measured. Once measured, the usage factor can be stored in a buffer or a cache or otherwise stored as a local copy. The usage factor can be transmitted to the usage factor database. Once the usage factor is measured in operation 618, then the method 600 can continue to operation 620.

In operation 620, the remote device can determine if there are more usage factors to measure. If there are more usage factors to measure, then the method 600 can continue to operation 614. If there are not any more usage factors to measure, then the method 600 can stop. In various embodiments, operation 614, 618, and 620 can be performed simultaneously for groups. For example, the remote device can receive all of the usage factors in operation 612, and measure the usage factors and transmit the usage factors to the usage factor database as a group as opposed to one at a time.

Figure 7:
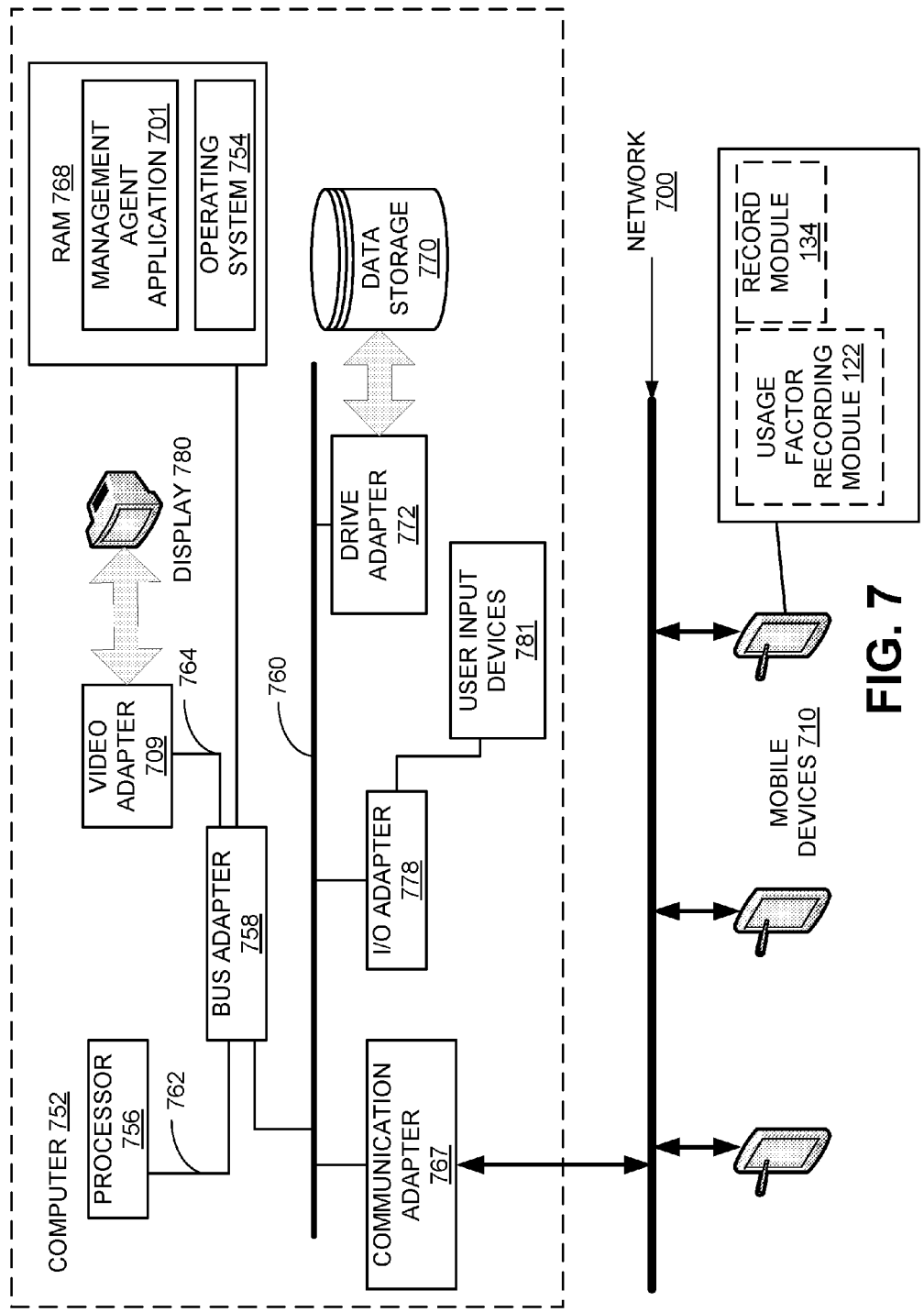
FIG. 7 depicts a block diagram of automated computing machinery, according to an embodiment.

FIG. 7 depicts a block diagram of automated computing machinery, according to an embodiment. The computing machinery can include example computer 752 useful in record filtering according to embodiments of the present invention. The computer 752 of FIG. 7 includes at least one computer processor 756 or 'CPU' as well as random access memory 768 ('RAM') which is connected through bus adapter 758 to processor 756 and to other components of the computer 752.

Stored in RAM 768 is a management agent application 701, a module of computer program instructions designed for filtering records according to embodiments of the present invention. Also stored in RAM 768 is an operating system 754. Operating systems useful for record filtering according to embodiments of the present invention include UNIX®, Linux®, Microsoft XP™, AIX®, IBM's i5/OS™, and others. The operating system 754 and management agent application 701 are shown in RAM (768), but many components of such software typically are stored in non-volatile memory also, such as, for example, on a disk drive 770.

The computer 752 can also include disk drive adapter 772 coupled through expansion bus 760 and bus adapter 758 to processor 756 and other components of the computer 752. Disk drive adapter 772 connects non-volatile data storage to the computer 752 in the form of disk drive 770. Disk drive adapters useful in computers for filtering records according to embodiments of the present invention include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on.

The example computer 752 includes one or more input/output ('I/O') adapters 778. I/O adapters implement user-oriented input/output through, for example, software drivers and computer hardware for controlling output to display devices such as computer display screens, as well as user input from user input devices 781 such as keyboards and mice. The example computer 752 includes a video adapter 709, which is an example of an I/O adapter specially designed for graphic output to a display device 780 such as a display screen or computer monitor. Video adapter 709 is connected to processor 756 through a high speed video bus 764, bus adapter 758, and the front side bus 762, which is also a high speed bus.

The example computer 752 includes a communications adapter 767 for data communications with other computers 710, e.g., mobile devices, and for data communications with a data communications network 700. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for virtual machine migration according to embodiments of the present invention include modems for wired dial-up communications, Ethernet (IEEE 802.3) adapters for wired data communications network communications, and 802.77 adapters for wireless data communications network communications.

A mobile device 710 can have local programs that are separate from the management agent application 701. The local programs can work in conjunction with the management agent application 701. The mobile device 701 can contain the usage factor recording module 122 or the record module 134 as discussed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 8:
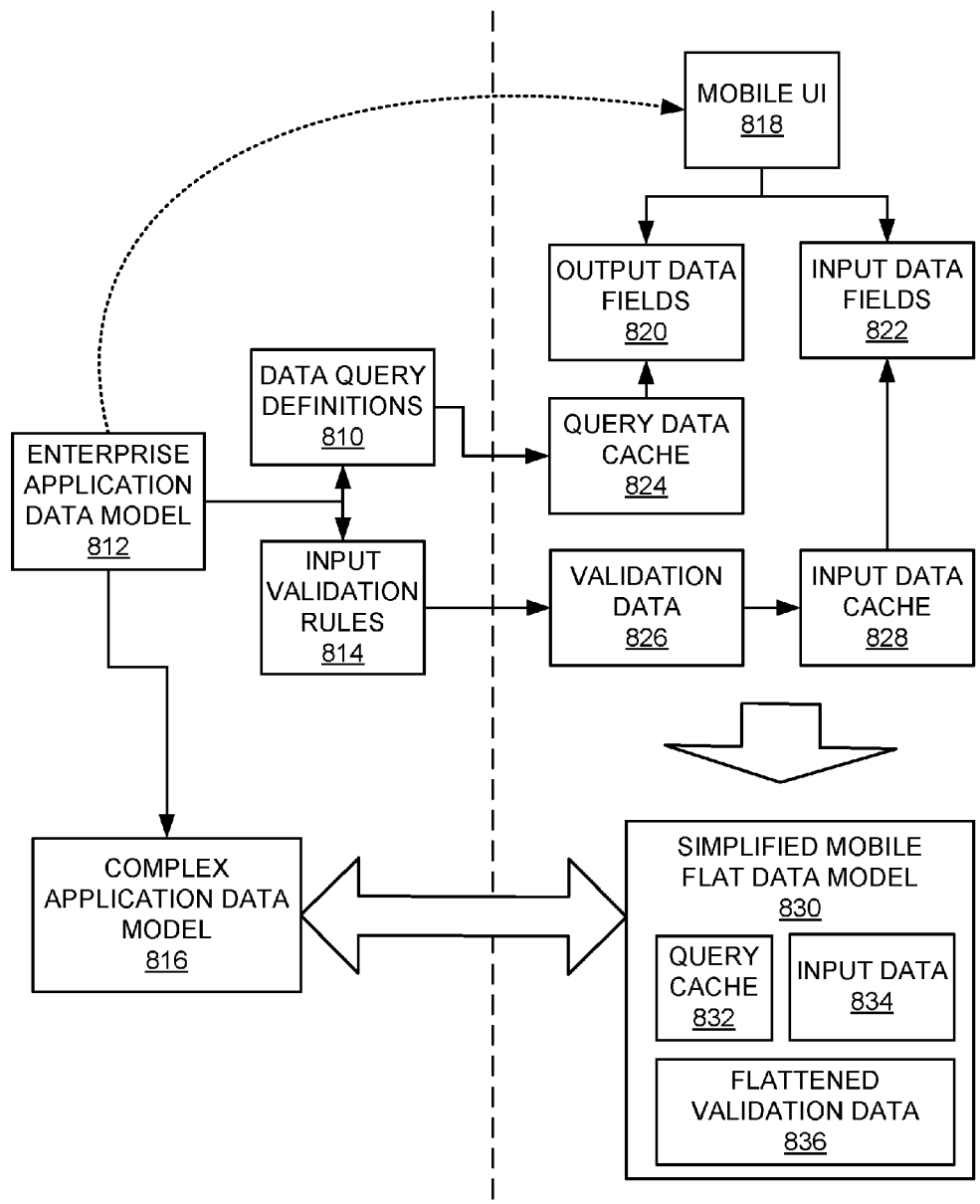
FIG. 8 depicts a mobile data model for a disconnected operation, according to various embodiments.

FIG. 8 depicts a mobile data model 800 for a disconnected operation of a mobile device from an enterprise server, according to various embodiments.

Given that local data storage may be required to support disconnected operations for a mobile device (having a mobile user interface (UI) 818), and it may be required that both functionality and data be extended/integrated with an existing enterprise application, embodiments may utilize various factors, tools, or methodologies, including enterprise application data rules and software-oriented architecture (SOA) integration methodologies, and mobile UI definition, among others.

A simplified mobile flat data model 830 (or simplified data model, for short) may be generated on the mobile device, and may be segmented into three areas: data queries to be stored in the query cache 832, supported flattened validation data 836 for validation rules, and storage for input data 834 (for transfer back to the enterprise application upon re-established connectivity). The result may be an efficient generated simplified data model for the mobile device to support disconnected operations.

Mobile solutions that extend existing enterprise applications may be based on available connectivity. A mobile application may vary in technology, e.g., native, web-based or hybrid. The data may be stored on the server-side; thus, no local data storage may be required.

As an alternative, there may be mobile-supported storage capabilities, either leveraging HTML5 constructs, local file storage, or mobile relational databases. Various models may allow for full disconnected operations. However, implementation may occur by duplicating the data model as defined by the enterprise application, which may be inefficient. Even as a subset of role-based data requirements, the data model can be both complex and may require application and/or data-specific development to support synchronization, which may not be desirable. Various models may result in duplication of business rules and logic across an enterprise desktop/server code-base as well as the mobile code, depending on the technologies utilized.

As described herein, embodiments may take advantage of several characteristics inherent in extending an existing enterprise application to the mobile space, including: enterprise application data rules that are known and defined, software-oriented architecture (SOA) integration methodologies, which may be used for data integration with the enterprise application, and/or a mobile UI 818, which may be structured and based on a subset of existing enterprise application function(s), as contained in a complex application data model 816.

Extension of the enterprise application to the mobile device may allow the mobile device to act as a new display and input mechanism with a unique feature being that it may be required to support operations when disconnected from the full enterprise infrastructure. There may be new mobile-based capabilities. The mobile device may extend and integrate with pre-existing core services, according to embodiments.

Embodiments of the present disclosure may allow for de-coupling of application rules with the actual input/output mechanism. Additionally, the storage requirements may be viewed as input/output cached information rather than being modeled after the much more complex enterprise services and relational model.

From a received or existing enterprise application, embodiments may utilize an existing enterprise application data model 812, which may be represented as a highly complex multi-tiered relational model 816 and coupled with data query services and input validation rules 814. The data query services may be based on an SOA integration model via web-services or structured query implementation (such as structured query language (SQL)) and definitions 810. Validation rules for data input 814 may encompass, but is not limited to, such considerations as: basic validation by data types (e.g., integer, date, strings), conditional data rules (e.g., equal to, greater-than, less-than) which may incorporate additional data elements, including data calculations resulting in values relating to additional data elements or input values, or identification of lookup data that is used for data selection on the mobile device.

Interpretation of various features or aspects may include: analyzing a mobile UI 818, which may provide data regarding a target scope of output data fields 820, such as lists or individual object data resulting from queries that are sourced from data query definitions 810 and stored in the mobile-device storage cache as query data cache 824. The query data cache 824 may support both list results as well as single object record details, according to various embodiments. Data query definitions 810 may also include binding information to the mobile UI 818 so that the query data cache 824 is mapped to the output data fields 820.

Similarly, mobile device data entry through input data fields 822, which may be identified in the mobile UI 818, may be validated according to the input validation rules 814, together with validation data 826 that has been collected and stored, per the input validation rules 814. This validation data 826 may be distinguished from the query data cache 824 as query data cache 824 is dynamic and the focus of the application processing with content defined by business logic from the enterprise application. Validation data 826, on the other hand, as described herein, may change less frequently, as well as may contain large amounts of reference data. Actual implementation of data transfer for each of these elements may be managed differently and may be scheduled according to need. Upon successful validation of the input data fields 822, the data may be stored in the local mobile-device storage as the input data cache 828.

A simplified mobile flat data model 830 may contain various constructs, including query cache 832, flattened validation data 836, and/or input data 834, and may not need to replicate and support the complex application data model 816.

Embodiments may support a transfer of data to and from the mobile device upon established connectivity, as well as operations in a disconnected mode. Extended disconnected operations may include additional consideration of various factors, including, but not limited to: transfer of required data to the mobile device to populate the query data cache 824 and/or validation data 826 in preparation for disconnected operations, transfer of input data cache 828 back to the application server, supported binding information of the complex application data model 816, and asynchronous error handling on the mobile device in a multi-user environment.

Figure 9:
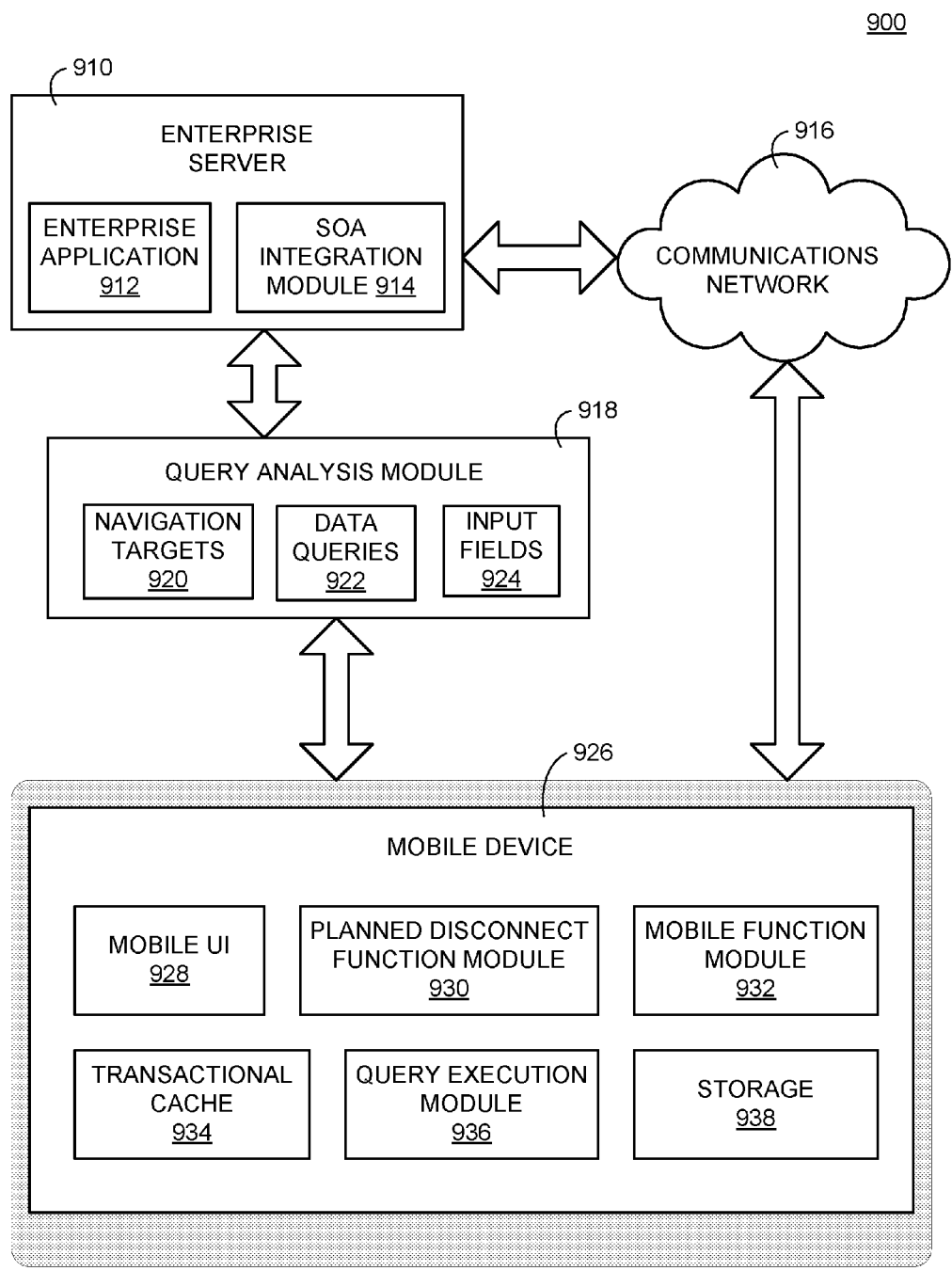
FIG. 9 depicts analysis and execution of a process flow for a disconnected operation, according to various embodiments.

FIG. 9 depicts analysis and execution of a process flow 900 for a disconnected operation, according to various embodiments.

Local data storage 938 may support disconnected operations for a mobile device 926, and both functionality and data may be extended or integrated with an existing enterprise application 912 on an enterprise server 910. Embodiments of this disclosure may include utilizing, for example, various enterprise application SOA integration methodologies, mobile UI definitions, mobile functions for data input, and/or one or more mobile data repositories in order to generate a set of data queries 922 from the mobile device and provide a new mobile function using a mobile function module 932 for planned disconnected operations. Planned disconnected operations may utilize a planned disconnect function module 930 located on the mobile device 926.

Various considerations may be utilized for analyzing various aspects of an application. For example, a computer system may analyze an applicable mobile UI 928 (e.g., to identify data queries), various mobile device functions (utilizing a mobile function module 932) for data input to drive queries or the identification of data boundaries in mobile device data storage 938. Other considerations may include identification of various mobile UI data list elements for triggering subsequent queries (using a query execution module 936), management of query input parameters driven by preceding queried data, identification and limiting of UI/data infinite loops, and/or allowance for developer tuning or limiting of mobile data queries for efficiency and performance tuning.

Embodiments may create a generated query set for the mobile device 926 to support planned disconnected operations (utilizing a planned disconnect function module 930) and may offer this to a user or developer as a new, common mobile feature via the mobile UI 928. Embodiments may consider specific query tuning by a developer. Various results may include a more efficient development effort, and/or broader availability of mobile device disconnected operations.

In the case of a mobile device application, an existing enterprise application 912 may extend functionality to operate on a mobile device 926, according to various embodiments. Embodiments may provide for a method that may allow for a common implementation for generating data transactions, through a communications network 916, necessary for a mobile device 926 to operate in a disconnected scenario.

For example, an enterprise server 910 may contain an enterprise application 912, which may support an SOA integration, using an SOA integration module 914, and which may support mobile data access and functionality through a communications network 916. The mobile device 926 may also contain a mobile UI 928, which may drive the mobile application. In various embodiments, there may be a transactional cache 934, which may temporarily contain and/or store data received from the enterprise server 910.

Embodiments may enable an extension of mobile operations or functions (contained in mobile function module 932) to disconnected scenarios by leveraging the mobile UI definitions, together with enterprise SOA definitions found in the SOA integration module 914, and new mobile device functions, in order to automatically manage all data considerations. Various embodiments may contain various components, including query analysis, for example, using an existing SOA integration and scanning the mobile UI 928 for identification of application data, including, for example, navigation targets, data queries, input fields, and/or query execution to be performed prior of a period of planned disconnection using the planned disconnect function module 930.

According to various embodiments, query execution may utilize various mobile functions for retrieval of input fields and dynamic conditions at the time of disconnection and may introduce a device storage 938, which may support redirection of application data queries, which may have otherwise been supported by a communication network and/or an SOA integration module, such as SOA integration module 914.

According to various embodiments, a new planned disconnect function (using the planned disconnect function module 930 and/or the mobile UI 928) can be introduced to the mobile device user. The planned disconnect function may trigger a query execution (using the query execution module 936) upon demand. Embodiments may utilize an existing enterprise application 912 and a mobile UI definition, which may be related to, based on, or independent of the enterprise application 912 UI.

The mobile UI 928 may be parsed and a navigation service may be implemented, which may interpret a mobile UI definition based on a known structure represented in, for example, extensible markup language (XML) or hyper-text markup language (HTML). The mobile UI 928 structure may contain various types of elements, including pages or forms, which may define the display container, UI elements of supported types (e.g., menus, text boxes, tables, buttons), and identification of user interactions, which may trigger events such opening a menu, navigation to a page or form, data calculations and so on.

In some embodiments, a mobile UI parse and navigation service may parse and scan various user execution navigation streams. The parse and scan operation may identify any query events and navigation targets. A query event may be associated with a defined data query and any inputs required, while a navigation target may define various user options for traversing the application for continued parsing, according to various embodiments.

As a result, a structure represented as a navigation target 920, input field(s) 924, and/or data queries 922, may encompass various data-related elements of the mobile UI 928, in addition to relating any data queries with the defined SOA integration (loaded on the SOA integration module 914) to the enterprise application 912.

An identification of the input fields to be obtained at the time of execution may include, but not be limited to, mobile function data, such as GPS readings, barcode scans or other mobile device features, or user input or selections, via a set of query/response UI controls such as but not limited to: question/answer, selection from a list, or multiple selections from a list. The identification of the input field may also include data results from previously executed queries within any navigation stream.

If the enterprise application 912 and/or the mobile application has been scanned and represented using the above structure, an operation may follow. For example, the operation may be used to identify and restrict loops that may occur through multiple application navigation occurrences to the same data query of the data queries 922. The loops may be infinite or extensive and expensive to perform. A default loop limit may be applied, with special considerations accommodated, as is further described herein.

In response to various data queries being identified and limited, the data queries can be further organized, according to various embodiments. The organization may include ordering and storing various data queries by object. According to various embodiments, a complete data set may be required for mobile application operation. In this case, the result may be manually reviewed for optimization and data management. This may provide a developer or user with an opportunity to manually review and tune the enterprise application 912 and mobile device 926 interaction for various considerations. Examples of considerations may include modification of data loop limits (as discussed herein), replacement of multiple queries with a more efficient single SOA integration, identification of expensive data operations to be made not available in a disconnected scenario, and/or data life-span, or expiration limits, per query. A potential benefit, as described herein, may be an automatic determination of the full data set and thus a simplification of an optimization effort.

Provided there exists a complete, tuned set of data queries 922 for identification of all mobile device application needs, and if disconnected operations are required, the mobile device 926 user may initiate an execution operation. The execution operation may include a user-planned disconnect using the planned disconnect function module 930, as described herein. On the mobile device 926, this may trigger various actions, such as loop queries, including any optimization and, if eligible for disconnected preparation, optimization and data management may retrieve input parameters for each query dynamically at the time of the user-planned disconnect on the mobile device 926, as determined herein, in a navigation query target input field structure using a query analysis module 918. As described herein, the navigation query target input field structure may include, but not be limited to, input fields 924, which may be defined as mobile function data, such as GPS readings, barcode scans, or other mobile device features.

The navigation query target input field structure may also include user inputs or selections, via a set of query/response UI controls such as: question/answer, selection from a list, and/or multiple selections from a list. The navigation query target input field structure may also include data results from previously executed queries within any navigation stream.

Where navigation query target input field structure defines the input parameters and characteristics, the values may be retrieved when the input parameters are retrieved.

An execute query may initiate SOA integration services with the enterprise application 912, and it may also store results on the mobile device storage 938 for access by the mobile application when the mobile device 926 is disconnected from the SOA integration module 914. As per the optimization and data management definition of data expiration options, a mobile device service may be implemented to remove "expired" data, according to various embodiments.

Figure 10:
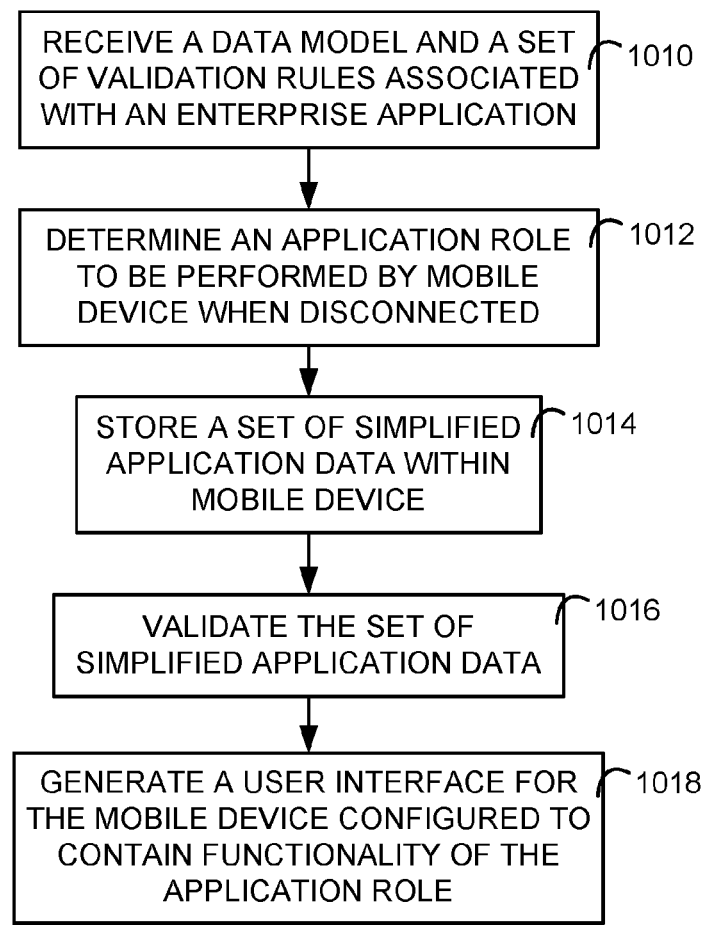
FIG. 10 depicts a flowchart for a mobile data schema for a disconnected operation, according to various embodiments.

FIG. 10 depicts a flowchart 1000 for generating a mobile data schema for a disconnected operation, according to various embodiments.

Per operation 1010, a process for generating a mobile database structure configured to operate when a mobile device is disconnected from an enterprise application server, depicted by flowchart 1000, may begin by receiving a data model and a set of validation rules associated with an enterprise application on the enterprise server. According to various embodiments, the validation rules may include validation by data type, conditional data rules, or data calculations. According to various embodiments, the data model may be represented as a multi-tiered relational model, and may be coupled with data query services based on a SOA integration model using one or more web-services or structured query implementation. Per operation 1012, the process may then determine an application role to be performed by a mobile device when disconnected from the enterprise server, or various other types of servers.

Per operation 1014, a set of simplified application data may be stored within the mobile device. According to various embodiments, the set of simplified application data may include data query definitions, which may be configured to map a query data cache to one or more output data fields. According to various embodiments, the one or more output data fields may include lists or individual object data resulting from queries sourced from data query definitions of the data query services. According to other embodiments, the one or more data output fields may be stored in a storage cache of the mobile device as a query data cache supporting the list results and single object record details.

Per operation 1016, the set of simplified application data may be validated by various methods, including by the set of validation rules, as described herein. According to various embodiments, the set of simplified application data may be in a predefined format and/or may have predefined data validation rules.

Per operation 1018, a user interface may be generated for the mobile device. The user interface may be configured to contain relevant or pertinent functionality of the application role or functionality based on the application roles, according to various embodiments. According to various embodiments, generating the user interface for a mobile device may include generating and/or displaying a scope of output data fields that is structured and based on a subset of existing enterprise application functions.

Various other embodiments may include receiving data entry at the mobile device through validating input data fields included in the user interface according to the set of validation rules for data input, and storing validation data based on the set of validation rules and the received data entry. The process may then end.

Figure 11:
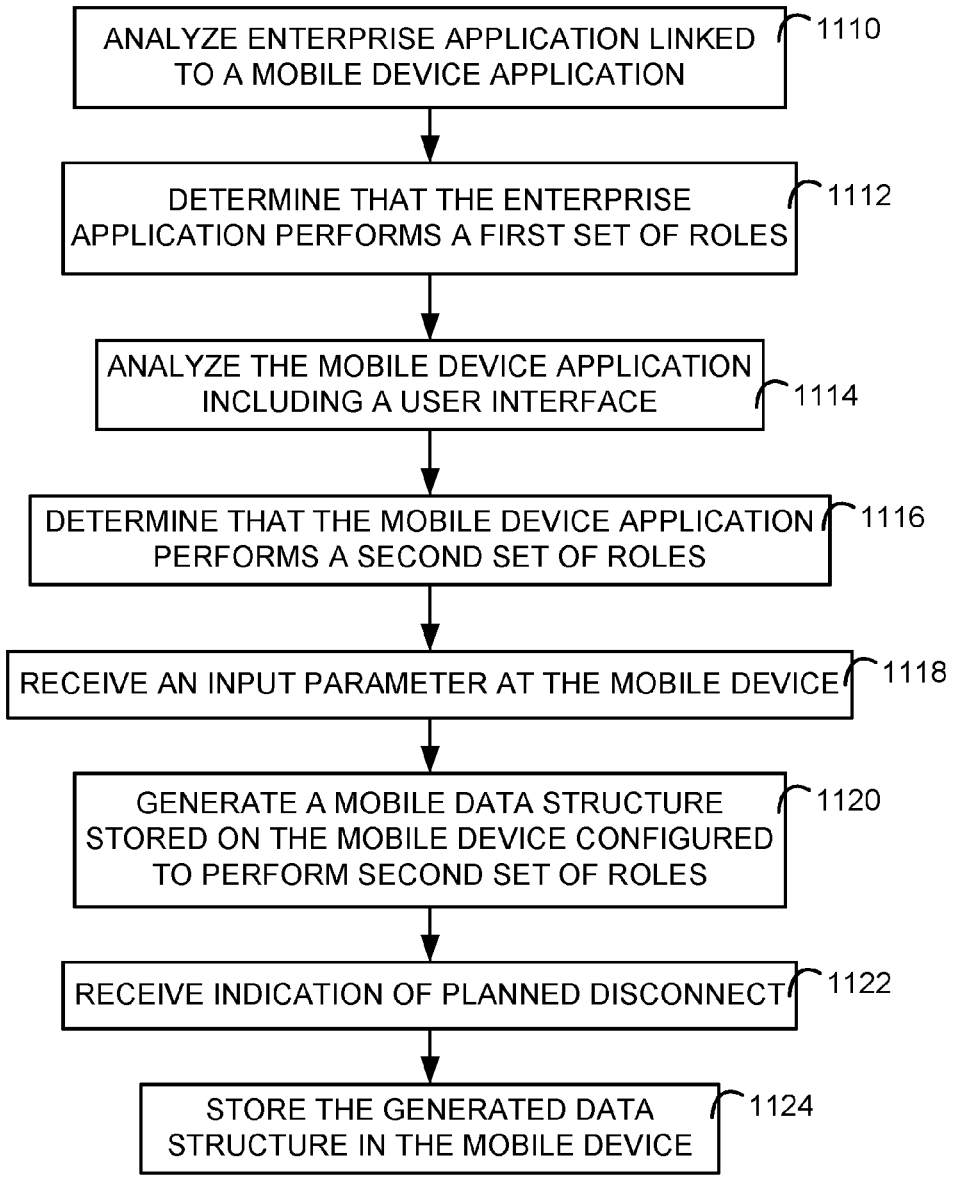
FIG. 11 depicts a flowchart for a method for a planned disconnect mobile function, according to various embodiments.

FIG. 11 depicts a flowchart 1100 for a method for a planned disconnect mobile function, according to various embodiments.

Per operation 1110, a process for adjusting a mobile function during a planned disconnect from an enterprise server, depicted by flowchart 1100, may begin by analyzing an enterprise application (e.g., enterprise application 912 of FIG. 9) that is linked to a mobile device application stored on, or accessed by, a mobile device. The mobile device application may utilize a service-oriented application (SOA) integration, according to various embodiments. The enterprise application may be stored on an enterprise server, according to various embodiments.

Per operation 1112, it may be determined that the enterprise application performs a first set of roles. Various roles may include tasks, jobs, functions, purposes, etc. Per operation 1114, the mobile device application on the mobile device may be analyzed, including analyzing a user interface structure on the mobile device, according to various embodiments. The analyzing the mobile device application may include using query analysis, according to various embodiments. The analyzing the mobile device application may also include identifying an application navigation target based on a user interface of the mobile device, according to various embodiments.

Per operation 1116, it may be determined that the mobile device application performs a second set of roles. According to various embodiments, the second set of roles may be a subset of the first set of roles. For example, managing one contact of a list of contacts, or one job of a list of jobs. Per operation 1118, an input parameter, as described herein, may be received at the mobile device and/or the mobile device application. Receiving the input parameter may include receiving a user option for traversing an application for continued parsing. Receiving the input parameter may also include determining that a query event is associated with a defined data query and input, according to various embodiments. The input parameter may be received via a set of query and/or response user interface controls including, e.g., question/answer, a single selection from a list, multiple selections from the list, and data results from previously executed queries within a navigation stream.

Per operation 1120, a mobile data structure may be generated, and the mobile data structure may be stored on the mobile device. According to various embodiments, the generating the mobile data structure may occur in response to the determining that the mobile device performs a second set of roles. The generating may include utilizing all data related elements of the mobile device user interface, in addition to relating any data queries with the existing service oriented application integration to the enterprise application, where identification of the navigation query target input fields obtained at the time of execution include information including mobile function data such as global positioning system readings, barcode scans, and mobile device features.

The mobile data structure may be configured to enable a mobile device to perform a second set of roles, according to various embodiments. The mobile data structure may be stored on the mobile device, according to various embodiments. The mobile data structure may include one or more navigation target input fields, according to various embodiments.

Per operation 1122, an indication of a planned disconnect may be received. The planned disconnect may be between the mobile device and the enterprise server or application, according to various embodiments. According to various embodiments, in response to the indication of the planned disconnect being received, per operation 1124, the generated data structure may be stored in the mobile device for disconnected execution.

According to various embodiments, the process may also identify a loop in the mobile device application that includes multiple application navigation occurrences to a first data query; and apply a first limit to the loop in response to the identifying the loop.

The process may then end.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the computing resources of the provider are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in various quantities at various times.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software-as-a-Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform-as-a-Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure-as-a-Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (e.g., private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Figure 12:
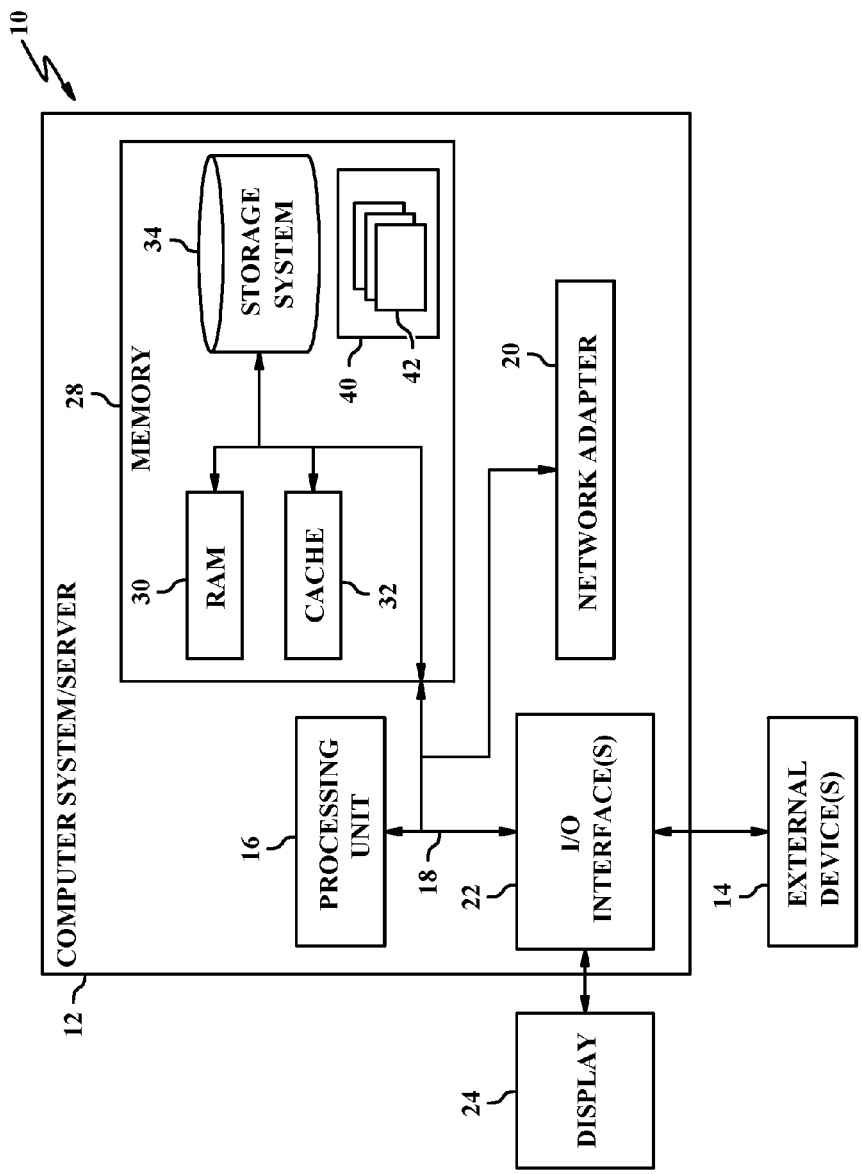
FIG. 12 depicts a cloud computing node, according to various embodiments.

Referring now to FIG. 12, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 13:
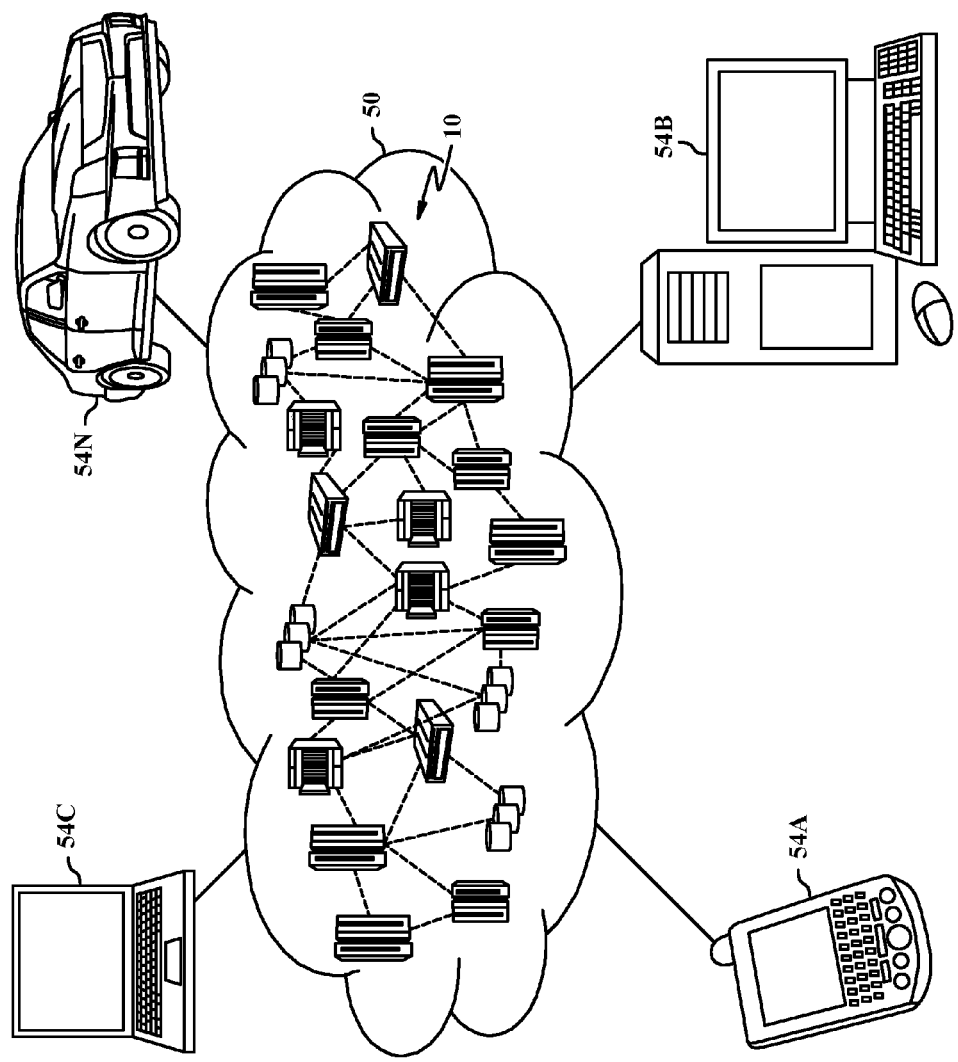
FIG. 13 depicts a cloud computing environment, according to various embodiments.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
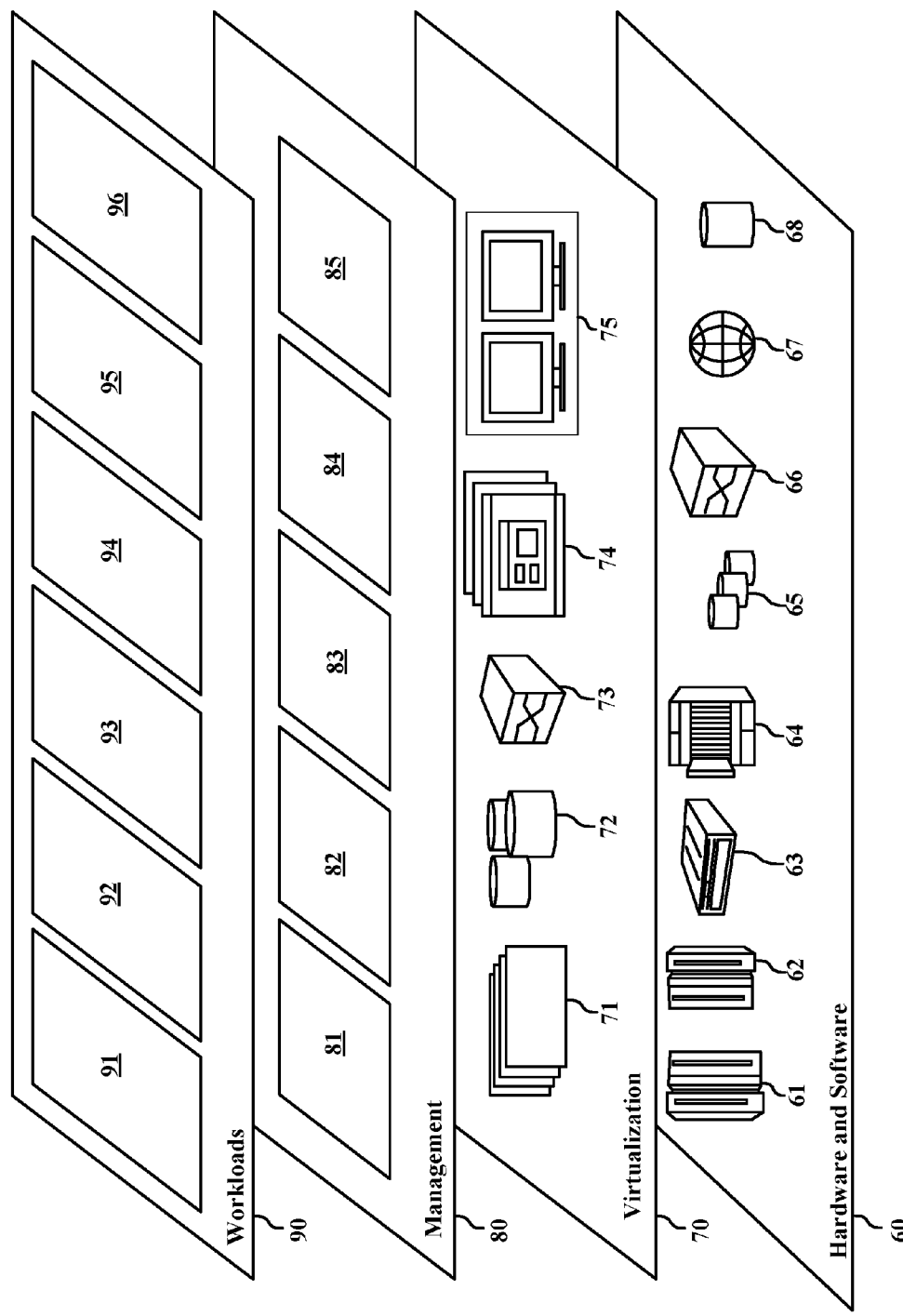
FIG. 14 depicts abstraction model layers, according to various embodiments.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions, which may be provided from this layer, include mapping and navigation 91; software development and lifecycle management 92; virtual classroom education delivery 93; data analytics processing 94; transaction processing 95; and mobile desktops 96.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for adjusting a mobile function during a planned disconnect from an enterprise server, comprising:
    analyzing an enterprise application linked to a mobile device application, wherein the enterprise application is located on the enterprise server;
    determining that the enterprise application performs a first set of roles;
    analyzing the mobile device application on a mobile device, including analyzing a user interface structure on the mobile device, wherein the analyzing the mobile device application uses query analysis;
    determining that the mobile device application performs a second set of roles, wherein the second set of roles is a subset of the first set of roles, and wherein the determining comprises filtering data based on usage of the data by the mobile device application, where the data is a subset of an entire dataset for the enterprise application;
    identifying a loop in the mobile device application that includes multiple application navigation occurrences to a first data query;
    applying a first limit to the loop in response to the identifying the loop;
    receiving an input parameter at the mobile device application;
    generating a mobile data structure in response to the determining that the mobile device performs the second set of roles, wherein the mobile data structure is stored on the mobile device, and wherein the mobile data structure is configured to perform the second set of roles;
    receiving an indication of a planned disconnect of the mobile device application from the enterprise application; and
    storing, in response to the receiving the indication of planned disconnect, the generated data structure in the mobile device for disconnected execution.

2. The method of claim 1, wherein the mobile device application utilizes a service-oriented architecture (SOA) integration.

3. The method of claim 1, wherein the analyzing the mobile device application includes identifying an application navigation target based on a user interface of the mobile device.

4. The method of claim 1, wherein the mobile data structure includes one or more navigation query target input fields.

5. The method of claim 1, wherein the receiving the input parameter at the mobile device application includes:
    receiving a user option for traversing an application for continued parsing; and
    determining that a query event is associated with a defined data query and input.

6. The method of claim 1, wherein the generating includes:
    utilizing data related elements of the mobile device user interface, and
    relating any data queries with the existing service oriented application integration to the enterprise application, wherein identification of the navigation query target input fields obtained at time of execution include information.

7. The method of claim 1, wherein the receiving the input parameter at the mobile device application is received via a set of query/response user interface controls.

8. A computing system for facilitating mobile disconnected operations, comprising:
one or more computer processor circuits that are configured to host a data compression model generation application that is configured to:
analyze an enterprise application linked to a mobile device application, wherein the enterprise application is located on the enterprise server;
determine that the enterprise application performs a first set of roles;
analyze the mobile device application on a mobile device, including analyzing a user interface structure on the mobile device, wherein the analyzing the mobile device application uses query analysis;
determine that the mobile device application performs a second set of roles, wherein the second set of roles is a subset of the first set of roles, where the second set of roles is determined by filtering data based on usage of the data by the mobile device application, where the data is a subset of an entire dataset for the enterprise application;
identify a loop in the mobile device application that includes multiple application navigation occurrences to a first data query;
apply a first limit to the loop in response to the identifying the loop;
receive an input parameter at the mobile device application;
generate a mobile data structure in response to the determining that the mobile device performs the second set of roles, wherein the mobile data structure is stored on the mobile device, and wherein the mobile data structure is configured to perform the second set of roles;
receive an indication of a planned disconnect of the mobile device application from the enterprise application; and
store, in response to the receiving the indication of planned disconnect, the generated data structure in the mobile device for disconnected execution.

9. The computer system of claim 8, wherein the mobile device application utilizes a service-oriented architecture (SOA) integration.

10. The computer system of claim 8, wherein the analyzing the mobile device application includes identifying an application navigation target based on a user interface of the mobile device.

11. The computer system of claim 8, wherein the receiving the input parameter at the mobile device application includes:
receiving a user option for traversing an application for continued parsing; and
determining that a query event is associated with a defined data query and input.

12. The computer system of claim 8, wherein the generating includes:

utilizing data related elements of the mobile device user interface, and
relating any data queries with the existing service oriented application integration to the enterprise application, wherein identification of the navigation query target input fields obtained at time of execution include information.

13. A computer program product for facilitating mobile device disconnected operations, the computer program product comprising a non-transitory computer readable storage medium having program code embodied therewith, the program code comprising computer readable program code configured to perform a method, comprising:
analyzing an enterprise application linked to a mobile device application, wherein the enterprise application is located on the enterprise server, wherein the analyzing the mobile device application uses query analysis;
determining that the enterprise application performs a first set of roles;
analyzing the mobile device application on a mobile device, including analyzing a user interface structure on the mobile device;
determining that the mobile device application performs a second set of roles, wherein the second set of roles is a subset of the first set of roles, and wherein the determining comprises filtering data based on usage of the data by the mobile device application, where the data is a subset of an entire dataset for the enterprise application;
identifying a loop in the mobile device application that includes multiple application navigation occurrences to a first data query;
applying a first limit to the loop in response to the identifying the loop;
receiving an input parameter at the mobile device application;
generating a mobile data structure in response to the determining that the mobile device performs the second set of roles, wherein the mobile data structure is stored on the mobile device, and wherein the mobile data structure is configured to perform the second set of roles;
receiving an indication of a planned disconnect of the mobile device application from the enterprise application;
storing, in response to the receiving the indication of planned disconnect, the generated data structure in the mobile device for disconnected execution.

14. The computer program product of claim 13, wherein the analyzing the mobile device application includes identifying an application navigation target based on a user interface of the mobile device.

15. The computer program product of claim 13, wherein the generating includes:
utilizing data related elements of the mobile device user interface, and
relating any data queries with the existing service oriented application integration to the enterprise application, wherein identification of the navigation query target input fields obtained at time of execution include information.

* * * * *